United States Patent
Katefidis et al.

(10) Patent No.: US 7,413,644 B2
(45) Date of Patent: Aug. 19, 2008

(54) INSTALLATION FOR THE CATAPHORETIC DIP COATING OF ARTICLES

(75) Inventors: Apostolos Katefidis, Gärtringen (DE); Werner Mai, Weil im Schönbuch (DE)

(73) Assignee: Eisenmann Anlagenbau GmbH & Co. KG, Boeblingen (DE)

( * ) Notice: Subject to any disclaimer, the term of this patent is extended or adjusted under 35 U.S.C. 154(b) by 610 days.

(21) Appl. No.: 10/630,232

(22) Filed: Jul. 30, 2003

(65) Prior Publication Data

US 2004/0226823 A1 Nov. 18, 2004

(30) Foreign Application Priority Data

Aug. 1, 2002 (DE) ................................ 102 35 117

(51) Int. Cl.
*C25D 17/12* (2006.01)

(52) U.S. Cl. ....................................... 204/626; 204/622

(58) Field of Classification Search .................. 204/626, 204/622

See application file for complete search history.

(56) References Cited

U.S. PATENT DOCUMENTS

| | | | | |
|---|---|---|---|---|
| 3,496,083 A | * | 2/1970 | Daisaburo et al. | ........... 204/482 |
| 4,026,780 A | * | 5/1977 | Gange | ......................... 204/490 |
| 4,879,013 A | * | 11/1989 | Austin | ......................... 204/505 |
| 5,114,554 A | * | 5/1992 | Voss et al. | ................... 204/482 |
| 6,083,376 A | * | 7/2000 | Akram et al. | ................ 205/143 |
| 6,132,570 A | * | 10/2000 | Akram et al. | ................ 204/202 |
| 6,610,187 B2 | * | 8/2003 | Nonomura et al. | ........... 204/512 |

FOREIGN PATENT DOCUMENTS

| | | |
|---|---|---|
| DE | 32 43 770 A1 | 7/1983 |
| EP | 0 382 254 | 8/1990 |
| EP | 0 424 807 B1 | 12/1994 |
| JP | 55006452 | 1/1980 |
| JP | 55050493 | 4/1980 |

* cited by examiner

*Primary Examiner*—Kishor Mayekar
(74) *Attorney, Agent, or Firm*—Factor & Lake, Ltd.

(57) ABSTRACT

An installation for the cataphoretic dip coating of articles, in particular of vehicle bodies, comprises in known manner a dip tank, into which the articles can be immersed. The negative terminal of a coating voltage source can be connected with the immersed articles; the positive terminal of the voltage source is connected with at least one anode immersed in the coating liquid present in the dip tank. This anode has a cross-sectional profile which, in at least one portion, is adapted as a curved surface to the outline of the articles to be treated in such a manner that the anode follows the outline of said article in approximately parallel manner. This is made possible by the electrodialysis apparatus, by means of which the acid formed during the coating operation is removed from the coating liquid and which is necessary for such installations, being arranged outside the dip tank.

7 Claims, 1 Drawing Sheet

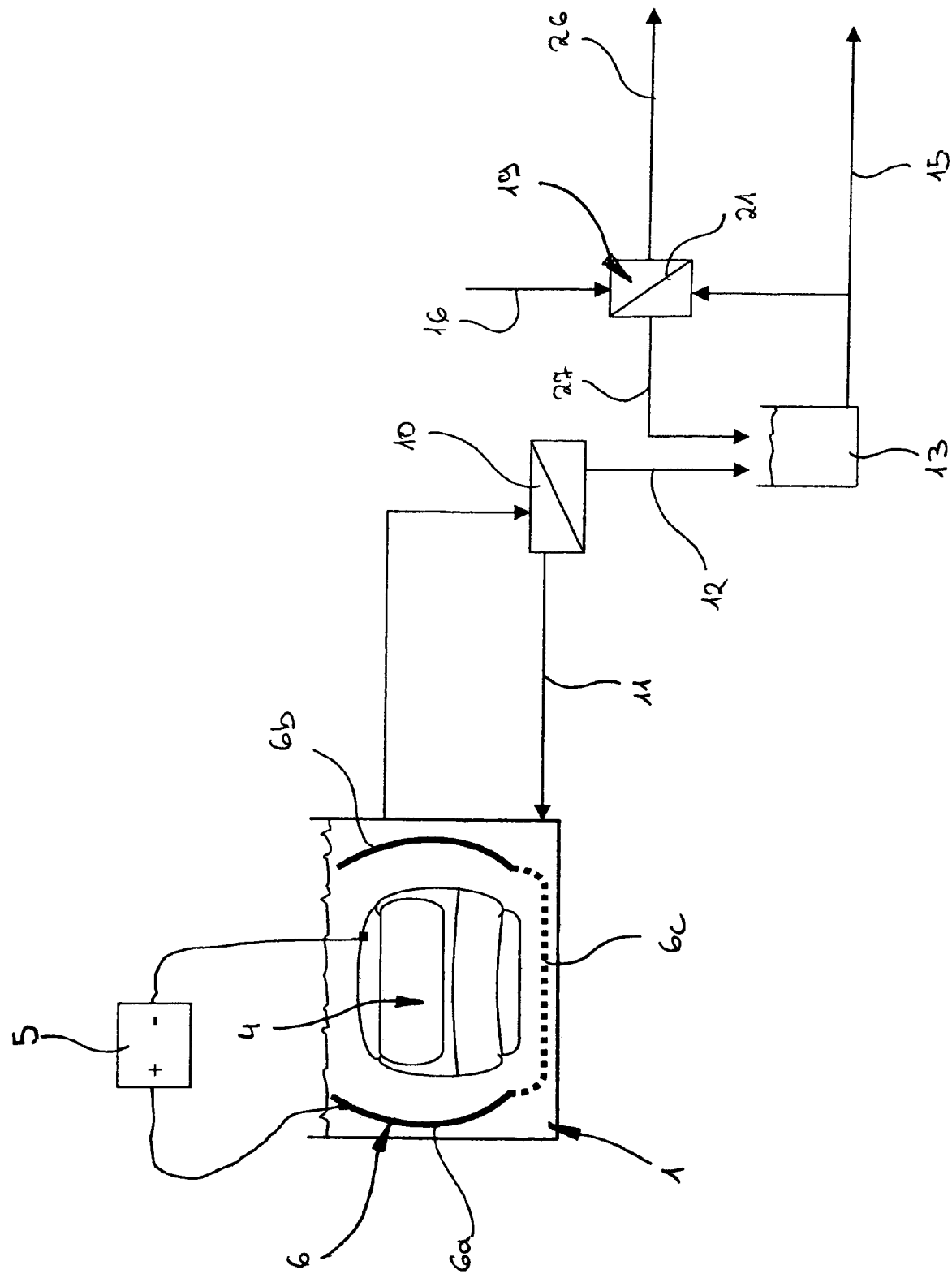

INSTALLATION FOR THE CATAPHORETIC DIP COATING OF ARTICLES

RELATED APPLICATIONS

The present invention claims the benefit of the filing date of German Patent Application, Serial No. 102 35 117.1, filed Aug. 1, 2002; the content of which is incorporated by reference herein.

BACKGROUND OF THE INVENTION

1. Field of the Invention

The invention relates to an installation for the cataphoretic dip coating of articles, in particular vehicle bodies, comprising
a) a dip tank, which is partially filled with a coating liquid, into which the articles can be immersed;
b) a coating voltage source, to the negative terminal of which the immersed articles can be connected and the positive terminal of which is connected with at least one anode immersed in the coating liquid present in the dip tank;
c) an electrodialysis apparatus, which is arranged outside the dip tank and by means of which the acid formed during the coating operation can be removed from the coating liquid, such that the acid content in the coating liquid remains within an admissible range.

2. Description of Related Art

In prior art installations for the cataphoretic dip coating of articles, the electrodialysis apparatuses, which ensured a substantially constant pH or conductance value of the coating liquid, were fitted inside the dip tank itself. The corresponding dialysis cells consisted of a housing, which bore an ion-exchange membrane which allowed anions to pass through, but was impermeable to cations and coating solids. The ion-exchange membrane here surrounded the anodes which were responsible for the cataphoretic coating operation. This design inevitably resulted in the anodes' being linear structures. However, since the articles to be coated themselves have an irregularly shaped outline, i.e. have for example curved surfaces, in the stated known installations non-uniform electrical fields were obtained between the anode and the articles to be coated, with the consequence that the thickness of the coating over all the areas of the article to be coated could be kept constant only with difficulty. In order to avoid excessively high local current densities, coating speed moreover had to be limited.

Cataphoretically operated installations with the electrodialysis apparatus fitted in the dip tank had certain further disadvantages which have resulted in the electrodialysis apparatus being removed from the dip tank in more recent known installations and arranged outside said tank with its own voltage source. Examples of such installations of the above-stated type are described in DE 32 43 770 A1, JP 55-00 6452 A and JP 55-05 0493 A. However, relocating the electrodialysis apparatus outside the dip tank in these latter-stated installations did not change the anodes from being linear structures. These installations accordingly also exhibit the above-described disadvantages.

BRIEF SUMMARY OF THE INVENTION

The object of the present invention is to develop an installation of the above-described type in such a manner that it is possible to achieve more consistent layer thicknesses on the articles to be coated and higher coating speeds.

This object is achieved according to the invention in that
d) the anode has a cross-sectional profile which, in at least one portion, is adapted as a curved surface to the outline of the articles to be treated in such a manner that the anode follows the outline of said articles in approximately parallel manner.

The invention is based on the recognition that relocating the electrodialysis apparatus outside the dip tank permits an entirely new freedom in the design of the anode: these anodes can now in fact be curved in virtually any desired manner and shaped such that they are at an approximately constant distance from the surfaces to be coated of the articles. As a consequence, the current flux profile between the anode and the article to be coated is substantially uniform; local variations in coating current density are largely avoided. In this manner, it is possible to achieve not only more consistent layer thicknesses, but also greater coating speeds.

The anode is conveniently a U-shaped profile with two lateral portions and a lower portion which joins the lateral portions together. In this manner, the articles to be coated in the dip coating bath can be surrounded on three sides by the anode, with only the top remaining free so that the article can be immersed in the dip coating bath.

Since the surfaces to be coated of many articles, in particular of vehicle bodies, are convex when viewed from the outside, it is advisable in these cases for the lateral portions of the anode to be curved concavely when viewed from the articles.

At least in their upper part, the anodes can consist of sheet metal. This is comparatively low in cost and also ensures an even distribution of current densities.

At least in its lower part, the anode should consist of a material permeable to the coating liquid, so that the coating liquid in the space enclosed by the anode can communicate with the coating liquid present in the space outside the anode.

Materials permeable to the coating liquid which may preferably be considered are wire mesh or screen netting, a grating or a plurality of mutually spaced rods.

In one particularly preferred embodiment of the invention, the anode consists at least in part of iridium-coated titanium. The situation is accordingly as follows: since, in a dip coating installation according to the invention, the electrodialysis apparatus is not arranged in the dip tank itself, the anode is no longer, as in prior art installations, protected from direct contact with the coating liquid and is thus at risk of corrosion. An anode consisting of iridium-coated titanium is not subject to such corrosion. This material moreover prevents anode material from passing into the coating liquid.

BRIEF DESCRIPTION OF THE DRAWINGS

An exemplary embodiment of the invention is illustrated in greater detail below in the drawing; the single FIGURE is a schematic diagram of an installation for the cataphoretic dip coating of vehicle bodies.

DETAILED DESCRIPTION OF THE PRESENT INVENTION

The installation comprises a dip tank 1 which is partially filled up to a certain level with coating liquid. The vehicle bodies 4 to be coated are guided perpendicularly to the plane of the drawing by means of a conveying system, which is not shown, and are first immersed in the dip tank 1, coated therein in a manner yet to be described and then moved on to rinsing stations, which are not shown in the drawing.

Cataphoretic coating in the dip tank 1 is carried out with the assistance of a coating current source 5, with the negative terminal of which the vehicle body 4 is connected while passing through the coating liquid. An anode 6, which is connected to the positive terminal of the coating current source 5, is also immersed in the coating liquid of the dip tank 1. The precise design and configuration of said anode 6 is described below.

A proportion of the coating liquid is continuously transferred from the dip tank 1 to an ultrafiltration unit 10. The retentate obtained in the ultrafiltration unit 10 is returned to the dip tank 1 via a line 11, while the permeate is transferred to a working container 13 via another line 12. The permeate collecting in said container is of the same ionic composition as the coating liquid in the dip tank 1, but contains no coating solids.

The permeate is taken from the working container 13 by means of a pump, which is not shown, and some is supplied via a line 15 as rinsing liquid to the various rinsing stations, which are not shown.

The permeate from the ultrafiltration unit 10 collecting in the working container 13 is additionally subjected to treatment by electrodialysis with the aim of depleting the acid concentration and so maintaining the pH or conductance value of the permeate, and thus ultimately of the coating liquid, within predetermined limits. To this end, an electrodialysis cell 19 is provided, which is supplied, again by means of a pump which is not shown, with some of the permeate from the ultrafiltration unit 10 collecting in the working container 13.

The internal structure of the electrodialysis cell 19 is shown only very schematically in the drawing. The cell contains at least one ion-specific ion-exchange membrane 21 together with a cathode and an anode which are arranged on opposite sides of the ion-exchange membrane 21 and are connected to a dialysis voltage source. For clarity's sake, the cathode, anode and dialysis voltage source are not shown in the drawing. The permeate supplied to the electrodialysis cell 19 flows through a chamber within the electrodialysis cell 19 which is delimited on one side by the ion-exchange membrane 21. Low-conductivity water is supplied via a line 16 to the chamber of the electrodialysis cell 19 located on the opposite side of the ion-exchange membrane 21. On passing through the electrodialysis cell 19, said water is enriched in known manner with anions which have passed over from the permeate through the ion-exchange membrane 21.

The water enriched in this manner is sent for waste water treatment via a line 26. The permeate, the acid content of which has been depleted, is on the other hand reintroduced via another line 27 into the working container 13.

The anode 6 arranged in the dip tank 1 has a substantially U-shaped profile in a cross-section perpendicular to the direction of motion of the vehicle bodies 4. The anode is composed of three portions 6a, 6b and 6c, which may all be produced from iridium-coated titanium. The portions 6a, 6b of the anode 6 located to the sides of the vehicle body 4 consist of sheet metal and are curved such that they follow the shape of the vehicle body 4 to be coated in approximately parallel manner. The lower portion 6c, which connects the lateral portions 6a, 6b of the anode 6, likewise follows the outline of the vehicle body 4 in this area in approximately parallel manner, but is produced from a wire mesh material. Alternatively, perforated sheets, screen or grating structures and parallel arrangements of bars may also be used at this point. What is vital is that, thanks to the lower portion 6c of the anode 6, it is possible for there to be a connection between the coating liquid located inside the anode 6 and that outside the anode 6.

The above-described coating installation operates as follows:

The vehicle bodies 4 are immersed in the coating liquid located in the dip tank 1 and are cataphoretically coated therein in the electrical field between them and the anode 6. Since the distance between the surfaces to be coated of the vehicle bodies 4 and the anode 6 is substantially constant at all points, the electrical field, in which coating takes place, is largely uniform in the vicinity of the vehicle body 4. In this manner, it is possible to achieve more uniform layer thicknesses and greater layer thicknesses in a shorter time than were hitherto possible.

After coating, the vehicle bodies 4 are lifted back out of the dip coating bath 1 and taken to the rinsing stations, which are not shown, where adhering coating liquid is rinsed off.

The removal of pigments from the coating liquid in the dip tank 1 is compensated by the addition of corresponding pigments.

During cataphoretic coating of the vehicle bodies 4 in the dip coating bath 1, the acid content rises in the coating liquid and thus also in the permeate leaving the ultrafiltration unit 10. Once a predetermined nominal value is exceed, permeate is circulated via the electrodialysis cell 19, where acid is removed from the permeate, so returning the pH or conductance value to the admissible range. The permeate, whose acid concentration has been reduced in this manner, passes via the rinsing stations, in which it is used as rinsing liquid, back to the dip tank 1, such that the acid depletion performed in the electrodialysis cell 19 has an effect there too.

Because the electrodialysis operation has been relocated out of the dip tank 1 and the anode 6 thus no longer needs to be surrounded by an electrodialysis cell, it is possible to adapt the anode 6 in the stated manner to the shape of the vehicle body 4 to be coated.

The invention claimed is:

1. An installation for the cataphoretic dip coating of articles, the installation comprising
    a) a dip tank, which is partially filled with a coating liquid, into which the articles can be immersed;
    b) a coating voltage source, to the negative terminal of which the immersed articles can be connected and the positive terminal of which is connected with at least one anode immersed in the coating liquid present in the dip tank;
    c) an electrodialysis apparatus, which is arranged outside the dip tank and by means of which the acid formed during the coating operation can be removed from the coating liquid, such that the acid content in the coating liquid remains within an admissible range, wherein
    d) the anode has a cross-sectional profile which, in at least one portion, is adapted as a curved surface to the outline of the articles to be treated in such a manner that the anode follows the outline of said articles in approximately parallel manner, and further wherein the anode has a U-shaped profile with two lateral portions and a lower portion, which joins the lateral portions together, wherein at least one of the lateral portions and/or the lower portion of the anode has a curved surface.

2. The installation according to claim 1, wherein the lateral portions of the anode are concavely curved when viewed from the articles.

3. The installation according to claim 1, wherein at least in its upper part, the anode consists of sheet metal.

4. The installation according to claim 1, wherein at least in its lower part, the anode consists of a material permeable to the coating liquid.

5. The installation according to claim 4, wherein the material permeable to the coating liquid is formed from a wire mesh or screen netting, a grating or a plurality of mutually spaced rods.

6. The installation according to claim 1, the anode consists at least in part of iridium-coated titanium.

7. The installation according to claim 1, wherein the articles include a vehicle body.

* * * * *